United States Patent [19]

Yamanaka

[11] Patent Number: 4,614,249
[45] Date of Patent: Sep. 30, 1986

[54] FRAME STRUCTURE FOR A FOUR-WHEEL DRIVE VEHICLE

[75] Inventor: Isao Yamanaka, Saitama, Japan

[73] Assignee: Honda Giken Kogyo Kabushiki Kaisha, Tokyo, Japan

[21] Appl. No.: 565,235

[22] Filed: Dec. 27, 1983

[30] Foreign Application Priority Data

Dec. 29, 1982 [JP] Japan .................................. 57-231840

[51] Int. Cl.⁴ ............................................. B60K 17/34
[52] U.S. Cl. ..................................... 180/312; 180/233;
280/282; 280/798; D12/88; D21/78
[58] Field of Search ............... 180/233, 230, 231, 241,
180/251, 219, 227, 228, 205, 206, 207, 215, 56,
72, 311, 312; 280/281 R, 281 B, 282, 274, 663,
95 R, 112 R, 790, 796, 798; D12/88; D21/78

[56] References Cited

U.S. PATENT DOCUMENTS

| | | | |
|---|---|---|---|
| D. 268,746 | 4/1983 | Greenhalgh et al. | D12/88 |
| D. 277,088 | 1/1985 | Murakami | D12/107 |
| 2,269,452 | 1/1942 | Ford et al. | 280/663 |
| 3,557,894 | 1/1971 | Hanley et al. | 180/312 |
| 4,535,869 | 8/1985 | Tsutsumikoshi et al. | 280/282 X |

FOREIGN PATENT DOCUMENTS 16693 of 1915 United Kingdom ................ 180/219

*Primary Examiner*—John J. Love
*Assistant Examiner*—Mitchell J. Hill
*Attorney, Agent, or Firm*—Lyon & Lyon

[57] ABSTRACT

A four-wheel drive vehicle of the type wherein the rider straddles the vehicle. The frame includes an upper frame structure which extends outwardly and downwardly to widely-based supports for the front axle while maintaining a narrow profile at the upper portion thereof. The lower frame structure extends rearwardly from a front axle support structure inwardly of the upper frame structure. As the upper frame structure converges, the lower frame structure extends laterally outwardly of the upper frame structure. Broad support for the front axle is provided by the upper frame structure while broad support for the engine and footpegs is provided by the lower frame structure.

4 Claims, 4 Drawing Figures

FRAME STRUCTURE FOR A FOUR-WHEEL DRIVE VEHICLE

BACKGROUND OF THE INVENTION

The field of the present invention is four-wheel drive vehicles of the type where the rider straddles the vehicle, and more specifically frame structures therefor.

Four-wheel drive vehicles have been developed employing a central frame structure with front and rear driven wheels. The central frame structure of such vehicles generally include an upper frame and a lower frame with a seat located on the upper frame and the engine between the frames. Such devices have found application to off-road riding for utilitarian and recreational purposes.

An advantageous feature to have on such vehicles is a relatively small turning radius. With a small turning radius, insurmountable objects in the terrain can be circumvented with greater facility. In addition, the frame structures of such vehicles must be relatively substantial in order to sustain the loads experienced in off-road use, particularly from tilting of the axle relative to the vehicle. However, such substantial structures generally have restricted the pivoting of the front wheels of such vehicles, increasing the minimum turning radius. Consequently, the structural requirements of such vehicles tend to interfere with their maneuverability.

SUMMARY OF THE INVENTION

The present invention pertains to frame structures for four-wheel drive vehicles, allowing substantial steering of the front wheels to permit reduced minimum turning radii. At the same time, substantial structural support is provided, particularly with respect to tilting of the front axle relative to the vehicle. Room is also provided for an engine mounted internally to the frame and a relatively narrow upper frame for comfortable straddle seating.

The foregoing may be accomplished through the employment of a front axle support structure, an upper frame structure which expands to broadly engage the front axle support structure and a lower frame structure extending to said front frame structure inwardly of said upper frame structure. Rearwardly of the front tires, the lower frame structure may be wider than the upper frame structure. Additionally, the frame structures may be made from two continuous tubes extending upwardly from the front axle support structure, rearwardly to a continuous U-bend and then forwardly again to the front axle support structure. Additional truss and cross members may add rigidity to the structure.

Accordingly, it is an object of the present invention to provide an improved frame structure for a four-wheel drive vehicle of the type where the rider straddles the vehicle. Other and further objects and advantages will appear hereinafter.

DETAILED DESCRIPTION OF THE PREFERRED EMBODIMENT

Figure 1:
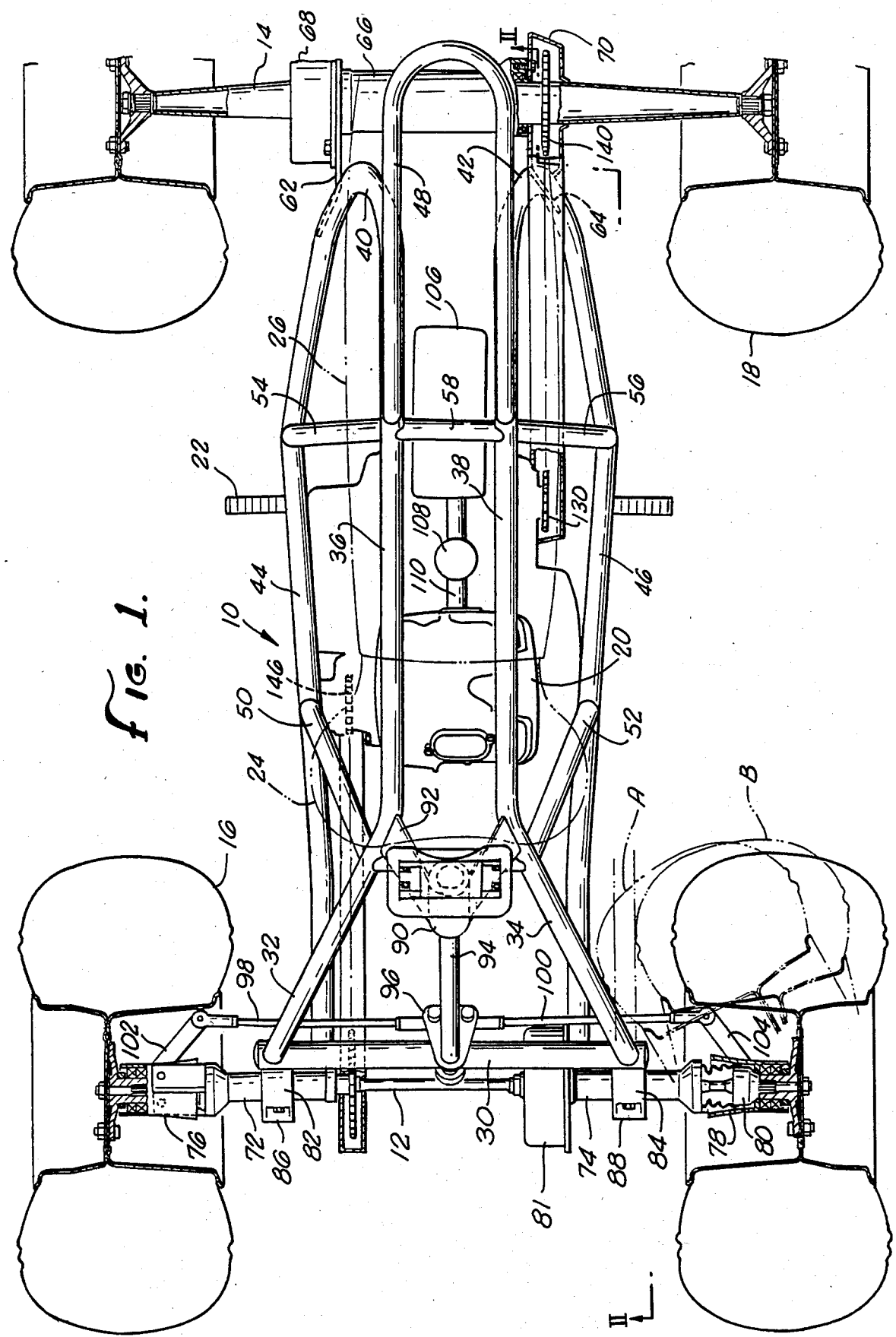
FIG. 1 is a plan view of a vehicle of the present invention.

Turning in detail to the drawings, a four-wheel drive vehicle is illustrated as including a frame, generally designated 10, associated with front and rear axles 12 and 14, respectively. Front wheels and tires 16 are steerably coupled to the ends of the axle 12 and rear wheels and tires 18 are fixed to the ends of the axle 14. An engine 20 is mounted inboard of the frame 10. Footpegs 22 extending laterally from the lower portion of the frame 10. A fuel tank 24 is positioned atop the frame 10 and a seat 26 is positioned behind the fuel tank 24 also atop the frame 10.

The frame 10 may be considered as several structural components. A front axle structure includes two transversely extending parallel members 28 and 30. The parallel members 28 and 30 are vertically arranged and generally extend between the front wheels and tires 16. The frame structure extends rearwardly from the front axle support structure and is generally symmetrical about a vertical plane extending through the vehicle centerline.

The frame includes an upper frame structure having two downtubes 32 and 34. The downtubes 32 and 34 extending vertically between the parallel members 28 and 30 of the front axle support structure as can best be seen in FIGS. 2 and 3. The two downtubes 32 and 34 extend from the front axle support structure at upwardly, rearwardly and mutually converging angles. Thus, the downtubes 32 and 34 attach at widelyspaced locations to the front axle support structure to rigidly prevent the front axle from tilting relative to the vehicle. Through the mutual convergence of the downtubes 32 and 34, the upper portion of the frame 10 is sufficiently narrow to accommodate a rider straddling the vehicle. Additionally, the mutual convergence provides room for the front wheels and tires to pivot through a wide steering angle.

The upper frame structure also includes two main body tubes 36 and 38 which extend rearwardly from the downtubes 32 and 34 in a substantially parallel manner. The main body tubes 36 and 38 are conveniently formed continuously with the downtubes 32 and 34, respectively. The fuel tank 24 and the seat 26 generally extend over the main body tubes 36 and 38. The main body tubes 36 and 38 also extend downwardly as well as rearwardly as can best be seen in FIG. 2. Rearwardly of the main body tubes 36 and 38 are U-bends 40 and 42. The U-bends are continuously formed with the main body tubes 36 and 38 and are located at the rear of the vehicle.

A lower frame structure extends rearwardly from the front axle support structure. The lower frame structure includes two lower frame tubes 44 and 46. The lower frame tubes 44 and 46 extend rearwardly from the lower parallel frame member 28 laterally inwardly of the downtubes 32 and 34. As the downtubes 32 and 34 converge, the lower frame tubes 44 and 46 become laterally outwardly of the downtubes 32 and 34. Consequently, the main body tubes 36 and 38 are wholly positioned inwardly and above the lower frame tubes 44 and 46. The lower frame tubes 44 and 46 may also mutually diverge to accommodate the engine 20. The lower frame tubes 44 and 46 also extend continuously into the U-bends 40 and 42. Thus, on each side of the vehicle, the downtubes, the main body tubes, the U-bends and the lower frame tubes are formed from individual continuous tubes.

Figure 2:
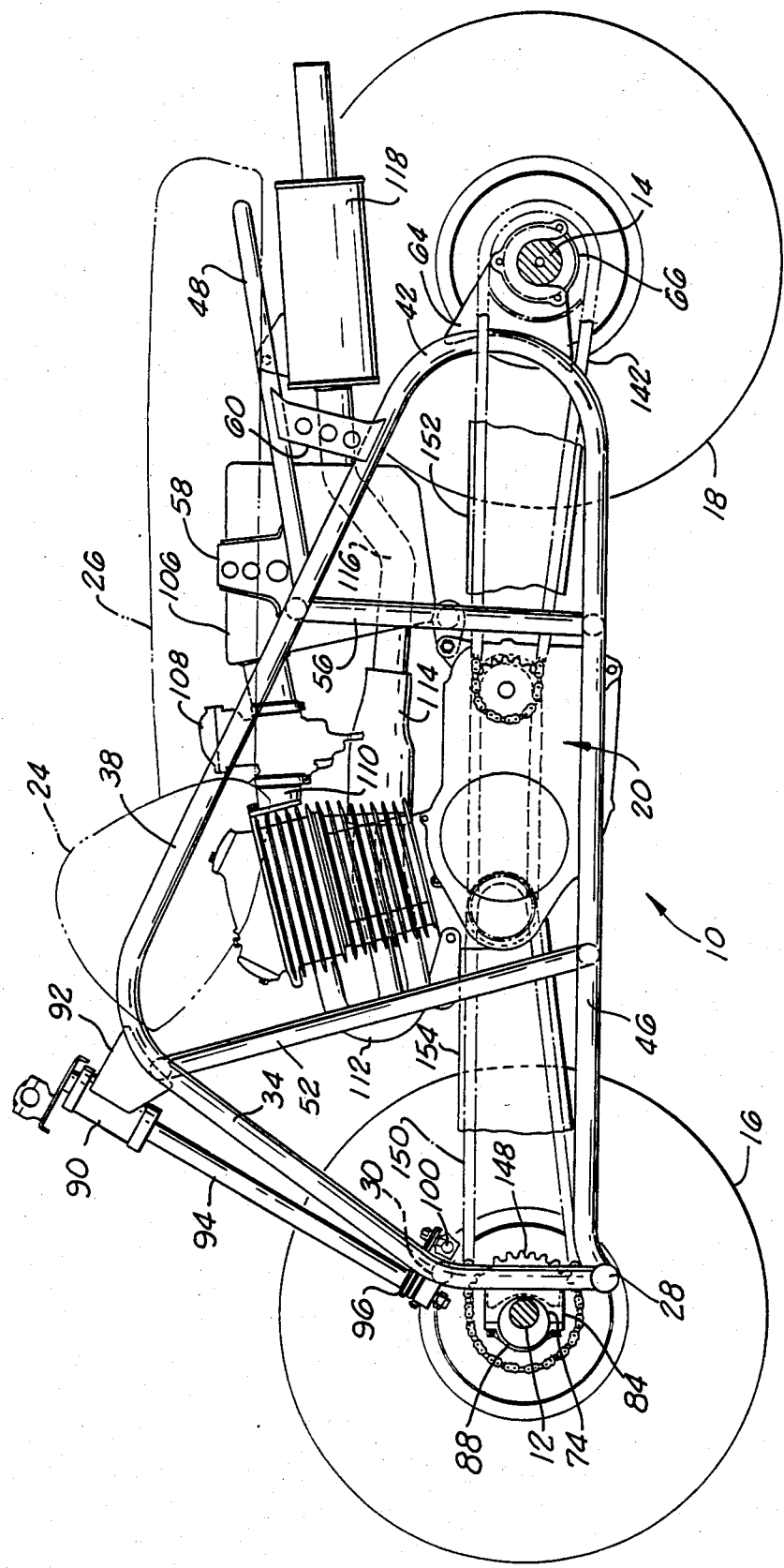
FIG. 2 is a cross-sectional side view of the vehicle taken along line II—II of FIG. 1.
Figure 3:
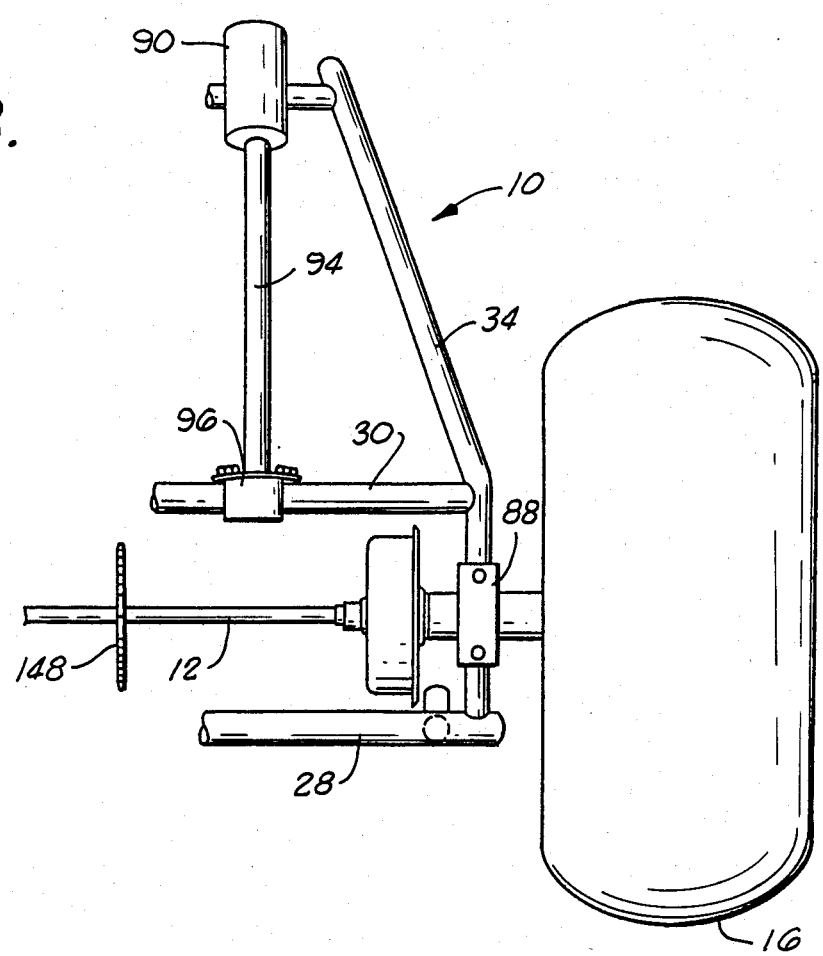
FIG. 3 is a partial front view of the vehicle of FIG. 1.
Figure 4:
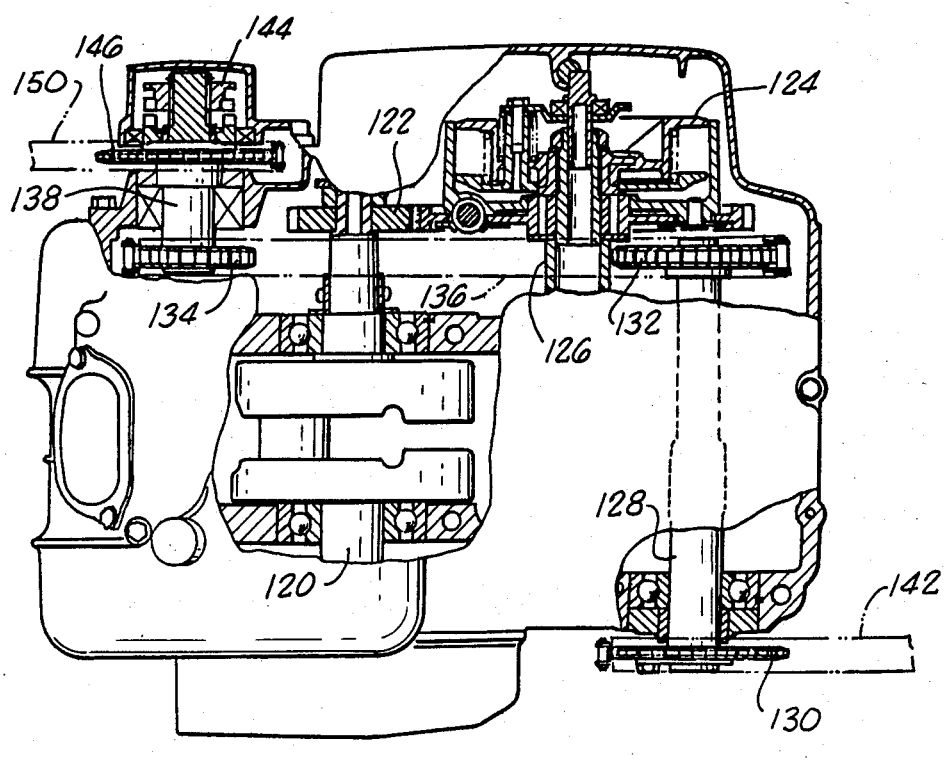
FIG. 4 is a plan view of an engine employed in the vehicle of FIG. 1.

To further support the seat 26, a rear frame structure 48 extends rearwardly and slightly upwardly, as can best be seen in FIG. 2, from the main body tubes 36 and 38. The rear frame structure 48 may be formed as a continuous U-bend.

To further rigidify the frame, struts 50 and 52 extend between the upper frame structure and lower frame structure. The two struts 50 and 52 conveniently extend from each of the downtubes 32 and 34, respectively, adjacent the intersection of the downtubes 32 and 34 with the main body tubes 36 and 38. Additionally struts 54 and 56 extend from the main body tubes 36 and 38, respectively, downwardly to the lower frame tubes 44 and 46, respectively. A cross strut 58 extends between the main body tubes 36 and 38 adjacent to the intersection with the rear frame structure 48. As can be seen in FIG. 2, the cross strut 58 may be arcuate and extend over mechanical components of the vehicle. Additional struts 60 may add support to the rear frame structure 48.

Fixed to the frame 10 at the U-bends 40 and 42 is the rear axle assembly. The assembly is supported to the U-bends 40 and 42 by means of brackets 62 and 64. The brackets 62 and 64 are rigidly coupled to a rear bearing tube 66 through which the axle 14 extends. Also associated with the rear bearing tube 66 is a brake 68 and a housing 70 for the power train.

The front axle assembly includes front bearing tubes 72 and 74 to support the axle 12. Steering knuckles 76 and 78 support the wheels and tires 16 with universal joints 80 coupling the axle 12 to the wheel hub. A front brake 81 is also provided.

As can best be seen in FIG. 2, holders 82 and 84 are fixed to the front axle support structure to retain the bearing tubes 72 and 74. Holder covers 86 and 88 retain the bearing tubes 72 and 74 in place in the holders 82 and 84. As the axle 12 is offset within the bearing tubes 72 and 74, rotation of the bearing tubes prior to being fixed by the holders 82 and 84 and the holder covers 86 and 88 will provide adjusted tension on the drive chain.

A steering assembly is employed which incorporates a head pipe 90 supported by means of a bracket 92 to the upper frame structure. The bracket 92 also acts as a cross member to structurally support the upper frame. Extending through the head pipe 90 is a steering shaft 94. The steering shaft 94 is pivotally mounted to the parallel member 30 and is fixed to a bell crank member 96. Pinned to the bell crank member 96 are tie rods 98 and 100 which extend to knuckle arms 102 and 104, respectively. Through rotation of the steering shaft 94, steering of the vehicle may thus be accomplished.

Located between the upper frame structure and the lower frame structure is the power train assembly. The engine 20 is centrally located within the vehicle between the lower frame tubes 44 and 46 and beneath the main body tubes 36 and 38. Associated with the engine 20 is an intake system including an air cleaner 106, a carburetor 108 and an intake 110. The exhaust system includes exhaust pipes 112 extending about one side of the engine and rearwardly to a collector 114, through an exhaust pipe 116 to a muffler 118. The muffler 118 is fixed to the rear frame 48.

Looking in greater detail to the engine 20, a transversely mounted crankshaft 120 is coupled to a reduction gear 122 which is in turn coupled to a clutch mechanism 124. The clutch mechanism drives a first transmission shaft 126 which in turn drives a second transmission shaft or first output shaft 128. The first output shaft 128 extends from the engine to a sprocket 130. The first output shaft also includes a power transmission sprocket 132 which is coupled to a sprocket 134 by means of a power transmission chain 136 through the engine case. The sprocket 134 is coupled to a second output shaft 138 extending from the other side of the engine from the output shaft 128.

To drive the rear axle 14, the driving sprocket 130 is coupled to a driven sprocket 140 on the rear axle 14 by means of a drive chain 142. The front axle 12 is driven by the drive shaft 138 through an engagement mechanism 144 which selectively couples a drive sprocket 146 to the shaft 138. The sprocket 146 is in turn coupled to a front driven sprocket 148 by means of a drive chain 150. Guards 152 and 154 surround the chains 142 and 150.

Thus, an improved four-wheel drive vehicle is disclosed which allows for a substantial reduction in minimum turning radius as indicated by the phantom profile of tire A in FIG. 1. A conventional frame structure allows movement as indicated by the tire in phantom outline B. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A frame for a four-wheel drive vehicle of the type where the rider straddles the vehicle, comprising
    a front axle support structure extending transversely of the vehicle;
    an upper frame structure including two downtubes extending upwardly, rearwardly and inwardly from said axle support structure and two main body tubes extending rearwardly from said downtubes;
    a lower frame strucutre extending rearwardly from said axle support structure, said lower frame structure including two lower frame tubes mutually spaced and extending rearwardly from said axle support structure, said lower frame structure being laterally inwardly of said downtubes at said axle support structure and laterally outwardly of said main body tubes; and
    each of said downtubes, main body tubes and lower frame tubes being formed from a continuous tube, said main body tube and said lower frame tube forming a continuous U-bend at the rear of the vehicle.

2. The frame of claim 1 further comprising a rear frame extending rearwardly from said upper frame structure.

3. A frame for a four-wheel drive vehicle of the type where the rider straddles the vehicle, comprising
    a front axle support structure extending transversely of the vehicle, said front axle support structure including two parallel members vertically arranged extending transversely of the vehicle and fixed rigidly together;
    an upper frame structure including two downtubes extending upwardly, rearwardly and inwardly from said axle support structure, said downtubes being mutually spaced at said axle support structure and extending from the upper one of said parallel members, and two main body tubes extending rearwardly from said downtubes; and a lower frame structure extending rearwardly from said axle support structure, said lower frame structure being laterally inwardly of said downtubes at said axle support structure, laterally outwardly of said main body tubes, and extending from the lower one of said parallel members.

4. The frame of claim 3 further comprising two struts extending between said upper frame structure and said lower frame structure.

* * * * *